(12) United States Patent
Fritz

(10) Patent No.: US 9,943,953 B2
(45) Date of Patent: Apr. 17, 2018

(54) UNIVERSAL SECOND HANDLE

(71) Applicant: Keith Fritz, Slinger, WI (US)

(72) Inventor: Keith Fritz, Slinger, WI (US)

( * ) Notice: Subject to any disclaimer, the term of this patent is extended or adjusted under 35 U.S.C. 154(b) by 0 days.

(21) Appl. No.: 15/595,616

(22) Filed: May 15, 2017

(65) Prior Publication Data

US 2018/0021937 A1 Jan. 25, 2018

Related U.S. Application Data

(63) Continuation-in-part of application No. 15/214,328, filed on Jul. 19, 2016.

(51) Int. Cl.
| | |
|---|---|
| *B25G 3/10* | (2006.01) |
| *A01B 1/02* | (2006.01) |
| *B25G 1/10* | (2006.01) |
| B25G 1/06 | (2006.01) |
| B25G 3/02 | (2006.01) |

(52) U.S. Cl.
CPC .............. *B25G 3/10* (2013.01); *A01B 1/026* (2013.01); *B25G 1/102* (2013.01); *B25G 1/06* (2013.01); *B25G 1/10* (2013.01); *B25G 3/02* (2013.01)

(58) Field of Classification Search
CPC ............ B25G 3/10; B25G 1/102; A01B 1/026
USPC ...... 294/24, 25, 49, 57, 58, 59; 16/422, 426, 16/430
See application file for complete search history.

(56) References Cited

U.S. PATENT DOCUMENTS

| | | | |
|---|---|---|---|
| 85,956 A * | 1/1869 | Pinkham | |
| 161,678 A * | 4/1875 | Gardner | |
| 1,374,061 A * | 4/1921 | Coleman ................ | A01B 1/026 294/58 |
| 1,586,056 A * | 5/1926 | Walsh .................... | A01B 1/026 294/58 |
| 4,772,057 A * | 9/1988 | Harvey ................. | A01B 1/026 224/250 |
| 5,411,305 A * | 5/1995 | Revoldt ................ | A01B 1/026 294/54.5 |
| 5,472,252 A * | 12/1995 | Barone ................. | A01B 1/026 294/54.5 |
| 5,496,085 A * | 3/1996 | Middleton ............ | A01B 1/026 16/426 |
| 5,704,672 A * | 1/1998 | Sims ..................... | A01B 1/026 16/400 |
| 6,283,522 B1 * | 9/2001 | Renaud ................. | A01B 1/026 294/58 |
| 6,704,968 B2 * | 3/2004 | Lau ....................... | A01B 1/026 16/426 |
| 7,032,942 B2 * | 4/2006 | Stuart .................... | A01B 1/026 16/426 |
| 2005/0017525 A1 * | 1/2005 | Douziech ................. | E01H 5/02 294/58 |

* cited by examiner

*Primary Examiner* — Paul T Chin
(74) *Attorney, Agent, or Firm* — RG Patent Consulting, LLC; Rachel Gilboy

(57) ABSTRACT

A universal second handle for attachment to tool members including shovels, brooms, rakes, and pitchforks, that is easily placed on a handle thereof to increase flexibility and leverage for performing various operations by providing the ability to use the tool member with hands on two separate handles.

14 Claims, 7 Drawing Sheets

UNIVERSAL SECOND HANDLE

CROSS-REFERENCE TO RELATED APPLICATION

The present application is related to and claims priority from prior application Ser. No. 15/214,328, filed Jul. 19, 2016 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of outdoor implements and more specifically relates to a universal second handle.

2. Description of the Related Art

Many people use shovels and other outdoor hand tools for gardening, debris removal, snow removal and many other functions. Many shovels have handles several feet long and users place both hands on one handle to perform their functions. Sometimes it is difficult to get enough leverage to perform some operations and users try to figure out different ways of using the tool to maximize performance. But their options for improving performance are limited because they have only one handle available to them.

Ideally, a universal second handle should provide a second handle that can be easily placed on a shovel handle, or a broom, or a rake, or a pitchfork, or the like, to increase flexibility and leverage for performing various operations and, yet would operate reliably and be manufactured at a modest expense. Thus, a need exists for a reliable universal second handle to avoid the above-mentioned problems.

BRIEF SUMMARY OF THE INVENTION

In view of the foregoing disadvantages inherent in the known outdoor implement art, the present invention provides a novel universal second handle. The general purpose of the present invention, which will be described subsequently in greater detail is to provide an ability to use a shovel, or a broom, or a rake, or a pitchfork, or the like with hands on two separate handles to allow greater flexibility and leverage.

A universal second handle, adapted to be attached to a shovel, or a broom, or a rake, or a pitchfork, or the like handle allowing a user easy manipulation of the implement, is disclosed herein, in a preferred embodiment, comprising a second handle member having a hand grip adapted to fit a hand of a user, an extension adapted to provide leverage for a user, the extension having a first end, a length, and a second end, and a loop adapted to be attached to a shovel, or a broom, or a rake, or a pitchfork, or the like handle. Each of the second handle member, the extension, and the loop is formed of plastic.

The hand grip, measuring approximately five inches in length, comprises a rectangular tube having a tube first end and a tube second end. The second handle member is attached to the first end of the extension via a handle member attachment on the second handle member. The handle member attachment comprises a Y-shape having a first top end adapted to be fixedly attached to the tube first end, a second top end adapted to be fixedly attached to the tube second end, and a hollow extension receiver adapted to hold the first end of the extension.

The hollow extension receiver measures approximately two inches in length and approximately one and one quarter inch in diameter. The extension is formed as a rod measuring approximately sixteen inches in length and approximately one and one quarter inch in diameter. The first end of the extension is held within the hollow extension receiver via friction.

The loop measures approximately one and one quarter inch in diameter and is adapted to be secured to a length of a shovel handle at a loop securement location on the shovel handle. The loop is held in place via friction as a user applies pressure on the universal second handle. The loop securement location varies in relation to the shovel handle to suit a height of a user as the user adjusts the loop securement location as desired.

The loop is attached to the second end of the extension via a loop attachment member comprising a set screw. The set screw passes through a first side of the loop into the second end of the extension. The loop is adapted to be placed on a length of a shovel handle via a loop opening adapted to be slipped onto a shovel handle such that leverage can be increased by using two hands when using the universal second handle and a shovel.

The present invention holds significant improvements and serves as a universal second handle. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a universal second handle constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an outdoor implement (including a shovel, or a broom, or a rake, or a pitchfork, or the like) and more particularly to a universal second handle as used to provide the ability to use a shovel with hands on two separate handles to allow greater flexibility and leverage.

Generally speaking, a universal second handle is placed on a shovel handle. A user is then able to use the shovel handle with one hand and the universal second handle with a second hand to perform digging operations.

Figure 1:
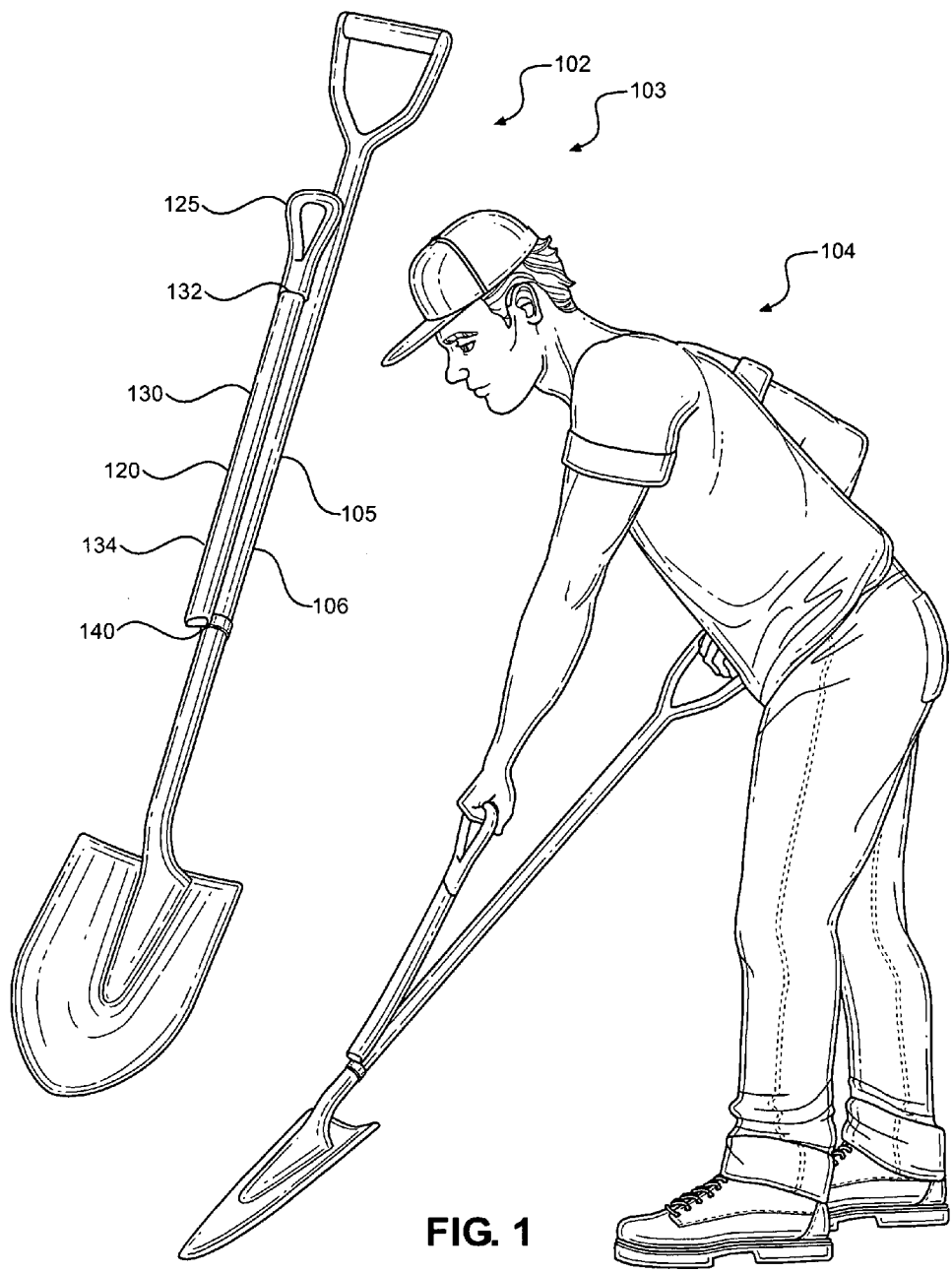
FIG. 1 shows a perspective view illustrating a universal second handle in an in use condition according to an embodiment of the present invention.

Referring to the drawings by numerals of reference there is shown in FIG. 1, a perspective view illustrating universal second handle 102 in an in use condition 103 according to an embodiment of the present invention.

Universal second handle 102, adapted to be attached to shovel handle 106 allowing user 104 easy manipulation of shovel 105, is disclosed herein, in a preferred embodiment, comprising second handle member 120 having hand grip 125 adapted to fit a hand of user 104, extension 130 adapted to provide leverage for user 104, extension 130 having first end 132, length 134, and second end 136, and loop 140 adapted to be attached to shovel handle 106. Each of second handle member 120, extension 130, and loop 140 is formed of plastic. Universal second handle 102 may also be used with any tool having a handle. Alternately each of second handle member 120, extension 130, and loop 140 may be formed of any suitable material.

Figure 2:
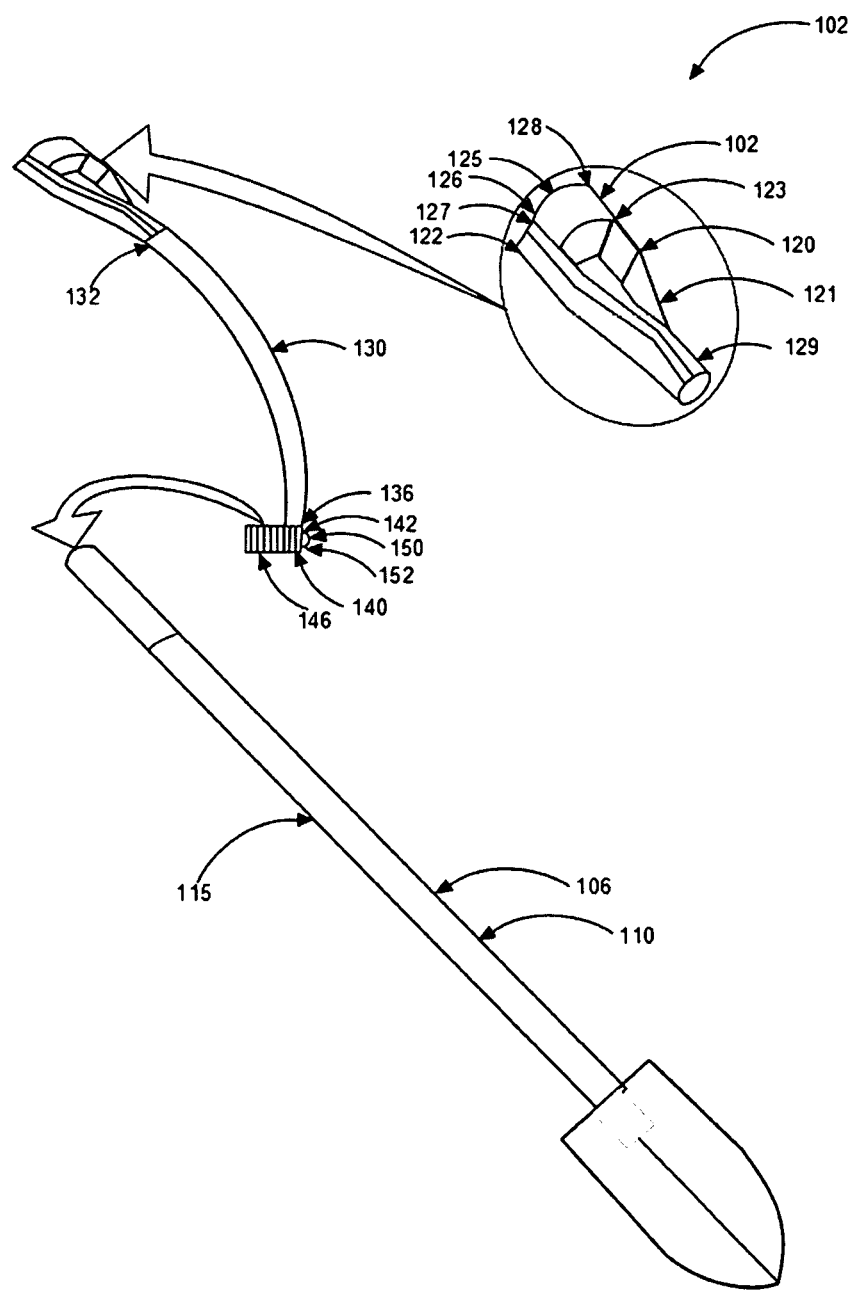
FIG. 2 is a perspective view illustrating a universal second handle according to an embodiment of the present invention of FIG. 1.

Referring now to FIG. 2, a perspective view illustrating universal second handle 102 according to an embodiment of the present invention of FIG. 1.

Hand grip 125, measuring approximately five inches in length, comprises rectangular tube 126 having tube first end 127 and tube second end 128. Second handle member 120 is attached to first end 132 of extension 130 via handle member attachment 121 on second handle member 120.

Handle member attachment 121 comprises a Y-shape having first top end 122 adapted to be fixedly attached to tube first end 127, second top end 123 adapted to be fixedly attached to tube second end 128, and hollow extension receiver 129 adapted to hold first end 132 of extension 130.

Hollow extension receiver 129 measures approximately two inches in length and approximately one and one quarter inch in diameter. Extension 130 is formed as a rod measuring approximately sixteen inches in length and approximately one and one quarter inch in diameter. First end 132 of extension 130 is held within hollow extension receiver 129 via friction. Extension 130 may be constructed in various lengths and diameters such that universal second handle 102 may be adapted to tools having a wide variety of lengths and diameters of handles.

Loop 140 is adapted to be placed on length 110 of shovel handle 106 via loop opening 146 adapted to be slipped onto shovel handle 106 such that leverage can be increased by using two hands when using universal second handle 102 and shovel 105.

Loop 140 is attached to second end 136 of extension 130 via loop attachment member 150 comprising set screw 152. Set screw 152 passes through first side 142 of loop 140 into second end 136 of extension 130. Loop 140 measures approximately one and one quarter inch in diameter and is adapted to be secured to length 110 of shovel handle 106 at loop securement location 115 on shovel handle 106. Loop 140 is held in place via friction as user 104 applies pressure on universal second handle 102. Loop securement location 115 varies in relation to shovel handle 106 to suit a height of user 104 as user 104 adjusts loop securement location 115 as desired. Loop 140 may be available is various sizes to be adapted to the size of tool handles.

Figure 3:
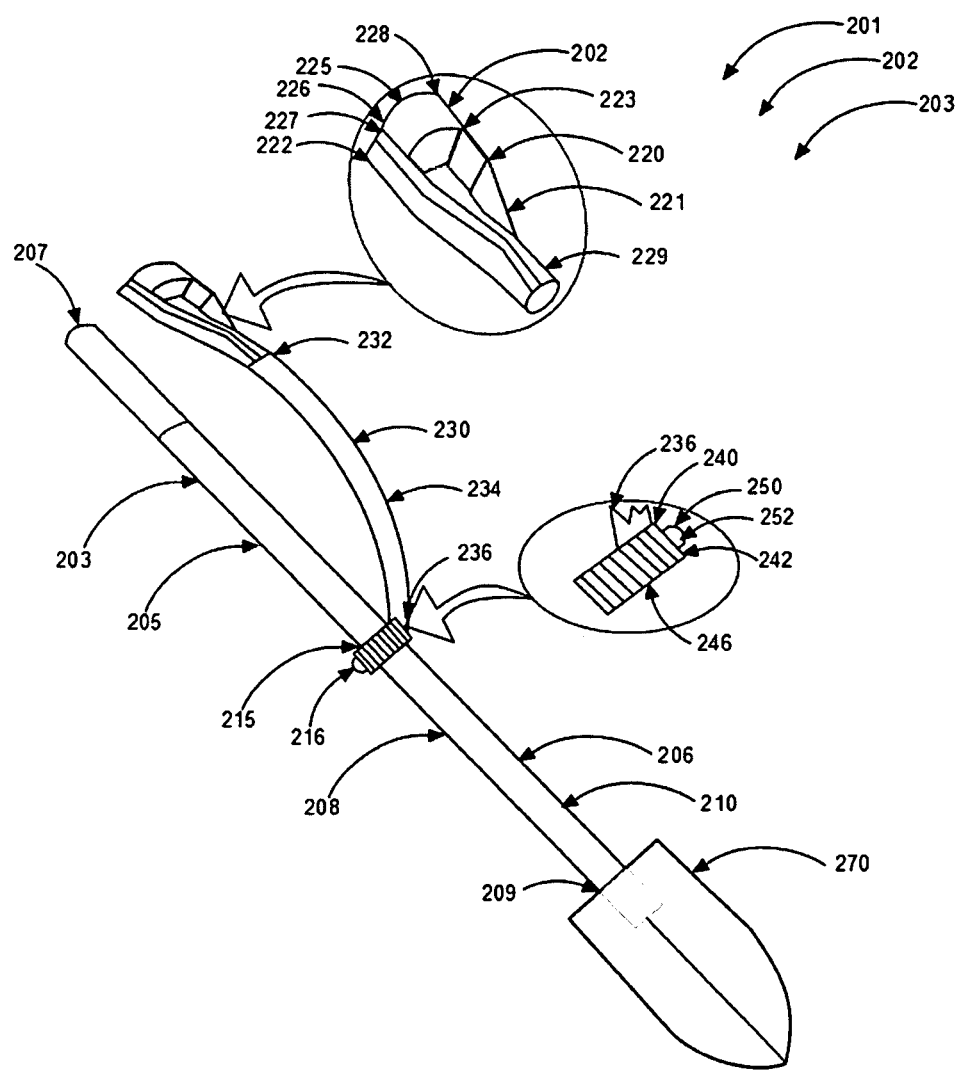
FIG. 3 is a perspective view illustrating a combination of a shovel and a universal second handle according to an embodiment of the present invention.

Referring now to FIG. 3, a perspective view illustrating combination 201 of shovel 205 and universal second handle 202 according to an embodiment of the present invention.

Combination 201 of shovel 203 and universal second handle 202 connected together to be used by two hands allowing a user easy manipulation of shovel 203 comprising shovel member 205 and universal second handle 202. Universal second handle 202 may also be used with any tool having a handle.

Shovel member 205 having shovel handle member 206 and blade member 270 is adapted to penetrate ground surfaces. Shovel handle member 206 comprises top end 207, length 208, and attachment end 209. Blade member 270 is attached to attachment end 209.

Universal second handle 202 is connected to shovel handle member 206 of shovel member 205 and adapted to be gripped by a second hand of a user. Universal second handle 202 comprises second handle member 220 having hand grip 225 adapted to fit a hand of a user, extension 230 comprising first end 232, length 234 and second end 236, adapted to provide leverage for a user, and loop 240 adapted to be attached to shovel handle member 206 of shovel member 205. Second handle member 220 is attached to first end 232 of extension 230 via handle member attachment 221.

Each of second handle member 220, extension 230, and loop 240 is formed of plastic. Alternately, each of second handle member 220, extension 230, and loop 240 may be formed of any suitable material.

Hand grip 225 comprises rectangular tube 226 measuring approximately five inches in length having tube first end 227 and tube second end 228. Handle member attachment 221 comprises a Y-shape having first top end 222 adapted to be fixedly attached to tube first end 227, second top end 223 adapted to be fixedly attached to tube second end 228, and hollow extension receiver 229 measuring approximately two inches in length and approximately one and one quarter inch in diameter adapted to hold first end 232 of extension 230. Extension 230 is formed as a rod measuring approximately sixteen inches in length and approximately one and one quarter inch in diameter. Extension 230 is held in place within hollow extension receiver 229 via friction.

Loop 240 is attached to second end 236 of extension 230 via loop attachment member 250 comprising set screw 252. Set screw 252 passes through first side 242 of loop 240 into second end 236 of extension 230. Loop 240 is adapted to be attached to shovel handle member 206 of shovel member 205 via loop opening 246 such that leverage for a user can be increased by using two hands with combination 201 of shovel 203 and universal second handle 202. Loop opening 246 measures approximately one and one quarter inch in diameter and is adapted to be slipped onto shovel handle member 206 of shovel member 205 via top end 207 of shovel handle member 206.

Loop 240 is adapted to be secured to length 208 of shovel handle member 206 of shovel member 205 at loop securement location 215 on shovel handle member 206 via set screw 216 screwed through loop 240 and into shovel handle member 206 at loop securement location 215.

Figure 4:
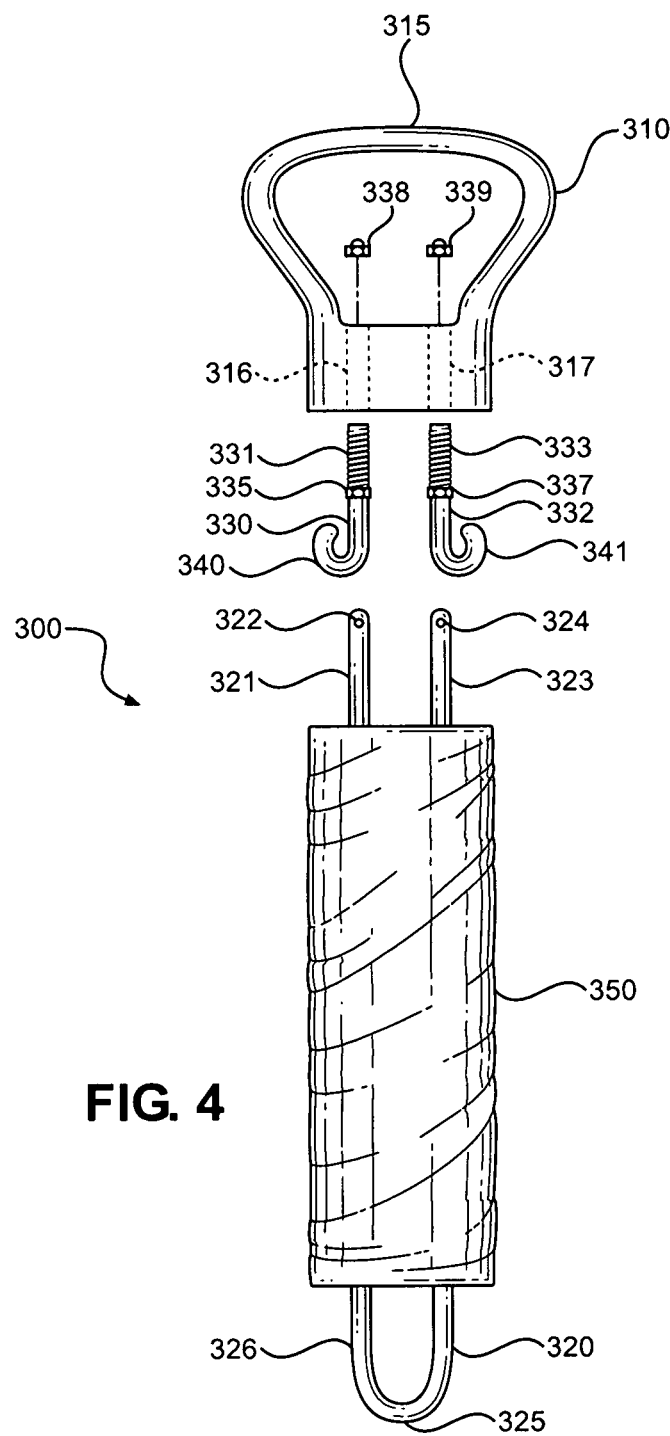
FIG. 4 is an exploded view illustrating a universal second handle according to a second embodiment of the present invention.
Figure 5A:
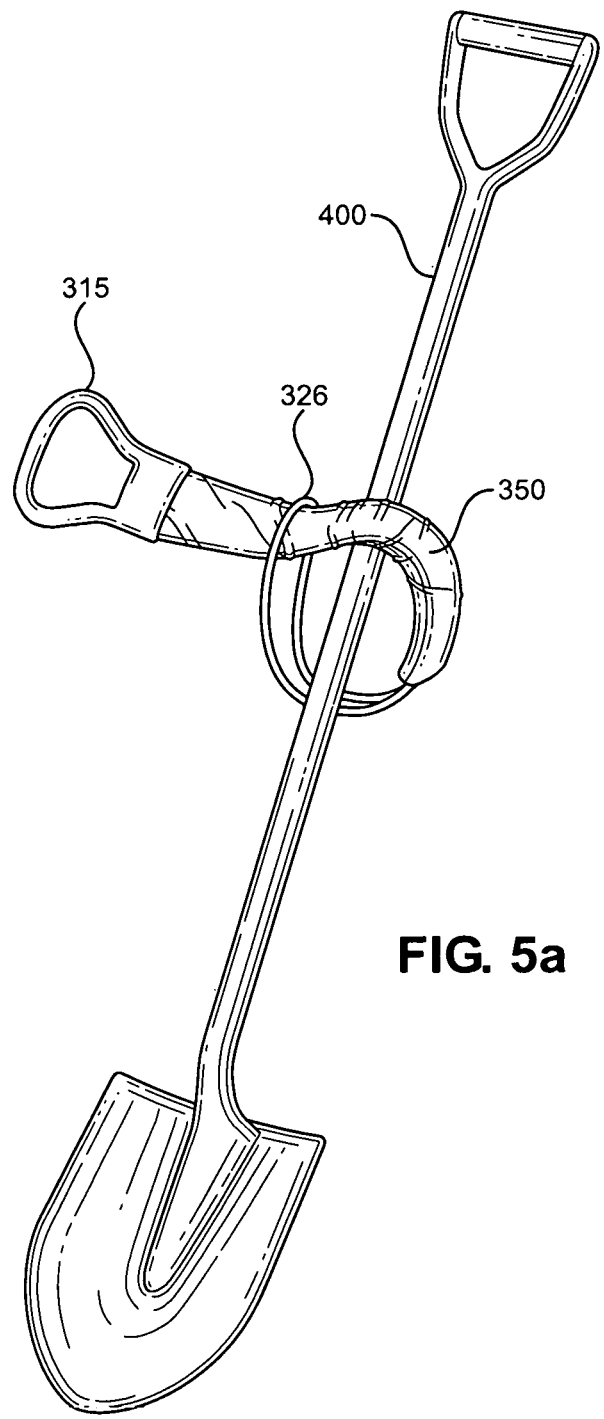
FIG. 5a is a perspective view illustrating the second embodiment of the universal second handle of the present invention being wrapped around a lower portion of an elongated handle of a shovel.
Figures 5B, 5C:
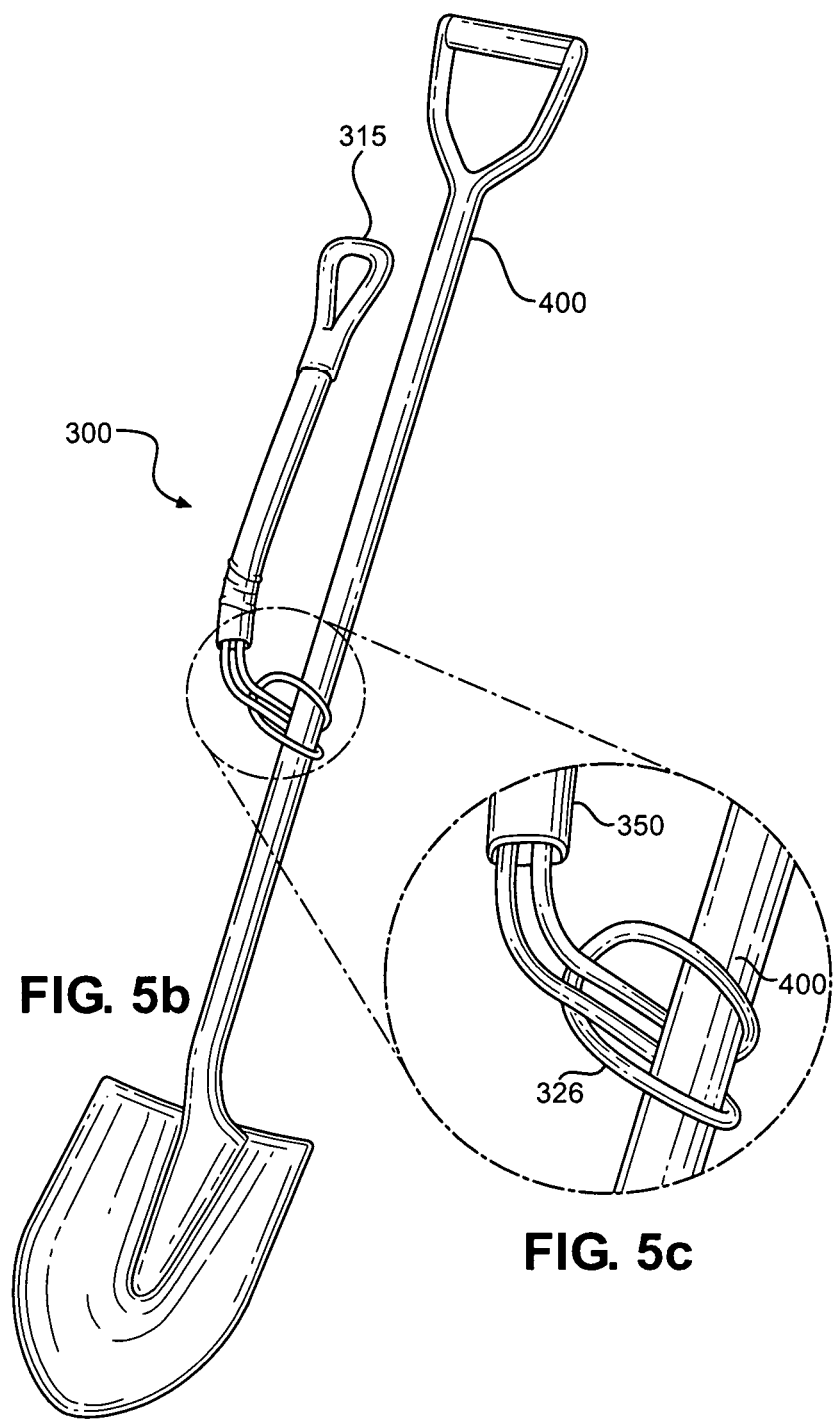
FIG. 5b is a perspective view illustrating the second embodiment of the universal second handle of the present invention being tightened around a lower portion of an elongated handle of a shovel.
FIG. 5c is a close-up view of the loop of the extension member being tightened around a lower portion of an elongated handle of a shovel of FIG. 5b.
Figure 6:
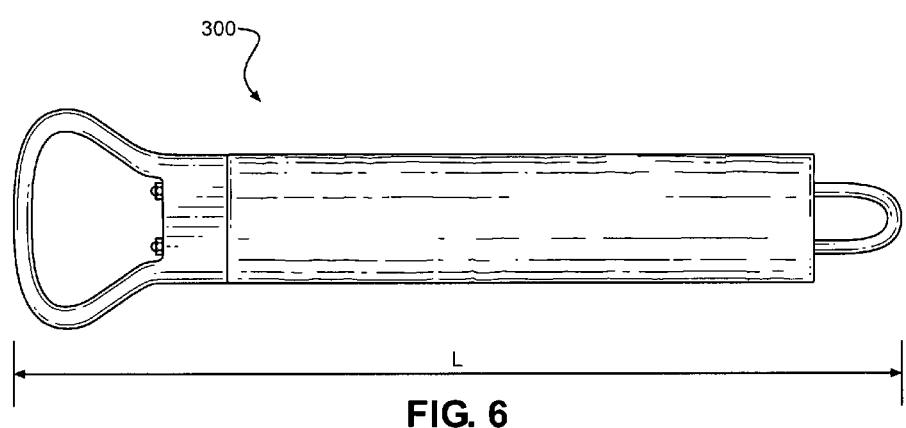
FIG. 6 is a side view illustrating a side view of the second embodiment of the universal second handle of the present invention.

A second embodiment of the universal second handle is illustrated in FIGS. 4-6, and as such the universal second handle 300 comprises a handle member 310 including a hand grip 315 adapted to be gripped by a hand of a user, a first attachment hole 316 passing therethrough, and a second attachment hole 317 passing therethrough and in proximity to the first attachment hole; an elongated extension member 320 comprising a first end 321 that includes a first attachment hole 322 therethrough, a length, and a second end 323 opposite the first end that includes a second attachment hole 324 therethrough; a first attachment member 330 adapted to pass through the first attachment hole 316 of the handle member, releasably attach to the handle member at one end thereof, pass through the first attachment hole 322 of the extension member, and releasably attach to the first end 321 of the extension member at a second end thereof; a second attachment member 332 adapted to pass through the second attachment hole 317 of the handle member, releasably attach to the handle member at one end thereof, pass through the second attachment hole 324 of the extension member, and releasably attach to the second end 323 of said extension member at a second end thereof, wherein said elongated extension member 320 forms a loop 325 when attached to said respective first and second attachment members, wherein the loop 325 is adapted to be wrapped around a lower portion of an elongated shovel handle 400, such that the handle member can pass therethrough, be gripped by a hand of the user, and pulled therethrough until tightened around the lower portion of the elongated shovel handle, such that while one hand of the user is gripping the elongated shovel handle at an upper portion thereof, a second hand can grip the handle member of the universal second handle to thereby increase the potential leverage upon the shovel member by the user in order to manipulate the shovel member more easily.

The second embodiment may further include a sleeve member 350 adapted to be placed over and around the loop 325 formed by the elongated extension member, such that a loop portion 326 extends outwardly from the sleeve member that is adapted to be wrapped around the lower portion of the elongated shovel handle as described above.

As shown in FIG. 4, the first and second attachment members (330 and 332) are formed as hook members, wherein each hook member includes a post portion (331 and 333) including threads at an end portion thereof, wherein the post portion is adapted to pass through a respective handle attachment hole (316 and 317); a spacer member (335 and 337) located at a middle section thereof; an attachment bolt member (338 and 339) adapted to be removably threaded upon the threads after the post potion is extended through the respective handle attachment hole, such that the spacer member and the attachment bolt member can be pressed against said opposite sides of the handle member and thereby rigidly attaching each hook member to the handle member; and a hook portion (340 and 341) adapted to be placed through and hook with a respective extension member attachment hole, such that the extension member is releasably connected to said handle member.

As shown in FIGS. 5a-5c, the handle member 315 is passed through the loop portion 326 formed by the elongated extension member and the sleeve member 350 after the elongated extension member is wrapped around the lower portion of the elongated shovel handle, and then pulled until the loop portion is tightened around the lower portion of the elongated shovel handle.

The handle member 315 and the sleeve member 350 can be formed from plastic, while the elongated extension member 320 can be formed from rubber. Furthermore, the first and second attachment members (330 and 332) can be formed from steel or stainless steel. Further, the elongated extension member 320 can be formed from an existing fertilizer hose, and the elongated extension member 320 can be formed from an existing rubber tarp strap. Furthermore, the attachment bolt members (338 and 339) can be formed as lock nuts.

The preferred length (L) of the universal second handle 300 of the second embodiment is 24 inches.

As discussed above, embodiments of the present invention relate to outdoor implements, including shovels, brooms, rakes, and pitchforks, to provide the ability to use the implement with hands on two separate handles to allow greater flexibility and leverage.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The invention claimed is:

1. A universal second handle for use with an elongated shovel handle of a shovel member to thereby allow a user to more easily manipulate said shovel member, comprising:
   a handle member including:
     a hand grip adapted to be gripped by a hand of a user;
     a first attachment hole passing therethrough; and
     a second attachment hole passing therethrough;
       wherein said second attachment hole is in proximity to said first attachment hole;
   an elongated extension member comprising:
     a first end;
       wherein said first end includes a first attachment hole therethrough;
     a length; and
     a second end opposite said first end;

wherein said second end includes a second attachment hole therethrough;
a first attachment member;
wherein said first attachment member is adapted to pass through said first attachment hole of said handle member, releasably attach to said handle member at one end thereof, pass through said first attachment hole of said extension member, and releasably attach to said first end of said extension member at a second end thereof;
a second attachment member;
wherein said second attachment member is adapted to pass through said second attachment hole of said handle member, releasably attach to said handle member at one end thereof, pass through said second attachment hole of said extension member, and releasably attach to said second end of said extension member at a second end thereof;
wherein said elongated extension member forms a loop when attached to said respective first and second attachment members; and
wherein said loop is adapted to be wrapped around a lower portion of said elongated shovel handle, such that said handle member can pass therethrough, be gripped by a hand of said user, and pulled therethrough until tightened around said lower portion of said elongated shovel handle, such that while one hand of said user is gripping said elongated shovel handle at an upper portion thereof, a second hand can grip said handle member of said universal second handle to thereby increase the potential leverage upon said shovel member by said user in order to manipulate said shovel member more easily.

2. The universal second handle of claim 1, further comprising:
a sleeve member;
wherein said sleeve member is adapted to be placed over and around said loop formed by said elongated extension member, such that a loop portion extends outwardly from said sleeve member that can be be wrapped around said lower portion of said elongated shovel handle.

3. The universal second handle of claim 1, wherein said first and second attachment members are formed as hook members, wherein each hook member includes:
a post portion including:
threads at an end portion thereof;
wherein said post portion is adapted to pass through a respective said handle attachment hole;
a spacer member located at a middle section thereof;
an attachment bolt member;
wherein said attachment bolt member is adapted to be removably threaded upon said threads after said post potion is extended through said respective said handle attachment hole, such that said spacer member and said attachment bolt member are adapted to press against said opposite sides of said handle member and thereby rigidly attach said hook member to said handle member; and
a hook portion;
wherein said hook portion is adapted to be placed through and hook with a respective said extension member attachment hole;
wherein said extension member is releasably connected to said handle member.

4. The universal second handle of claim 2, wherein said handle member and said sleeve member are formed from plastic.

5. The universal second handle of claim 3, wherein said elongated extension member is formed from rubber.

6. The universal second handle of claim 3, wherein said first and second attachment members are formed from a material chosen from a group of materials consisting of steel and stainless steel.

7. The universal second handle of claim 1, wherein said universal second handle is formed having a length of 24 inches.

8. A combination of a shovel and a universal second handle releasably connected together to be used by two hands of a user to thereby allow easier manipulation of said shovel, said combination comprising:
a shovel member including:
an elongated shovel handle including:
a top end;
a length; and
an attachment end; and
a blade member;
wherein said blade member is adapted to penetrate ground surfaces; and
wherein said blade member is attached to said attachment end of said elongated shovel handle; and
a handle member including:
a hand grip adapted to be gripped by a hand of a user;
a first attachment hole passing therethrough; and
a second attachment hole passing therethrough;
wherein said second attachment hole is in proximity to said first attachment hole;
an elongated extension member comprising:
a first end;
wherein said first end includes a first attachment hole therethrough;
a length; and
a second end opposite said first end;
wherein said second end includes a second attachment hole therethrough;
a first attachment member;
wherein said first attachment member is adapted to pass through said first attachment hole of said handle member, releasably attach to said handle member at one end thereof, pass through said first attachment hole of said extension member, and releasably attach to said first end of said extension member at a second end thereof;
a second attachment member;
wherein said second attachment member is adapted to pass through said second attachment hole of said handle member, releasably attach to said handle member at one end thereof, pass through said second attachment hole of said extension member, and releasably attach to said second end of said extension member at a second end thereof;
wherein said elongated extension member forms a loop when attached to said respective first and second attachment members; and
wherein said loop is adapted to be wrapped around a lower portion of said elongated shovel handle, such that said handle member can pass therethrough said loop, be gripped by a hand of said user, and pulled therethrough until tightened around said lower portion of said elongated shovel handle, such that while one hand of said user is gripping said elongated shovel handle at an upper portion thereof, a second hand can grip said handle member of said universal second handle to thereby increase the potential leverage upon said shovel member by said user in order to manipulate said shovel member more easily.

9. The combination of claim 8, wherein said universal second handle further comprises:
  a sleeve member;
    wherein said sleeve member is adapted to be placed over and around said loop formed by said elongated extension member, such that a loop portion extends outwardly from said sleeve member that can be be wrapped around said lower portion of said elongated shovel handle.

10. The combination of claim 8, wherein said first and second attachment members are formed as hook members, wherein each hook member includes:
  a post portion including;
    threads at an end portion thereof;
    wherein said post portion is adapted to pass through a respective said handle attachment hole;
  a spacer member located at a middle section thereof;
  an attachment bolt member;
    wherein said attachment bolt member is adapted to be removably threaded upon said threads after said post potion is extended through said respective said handle attachment hole, such that said spacer member and said attachment bolt member are adapted to press against said opposite sides of said handle member and thereby rigidly attach said hook member to said handle member; and
  a hook portion;
    wherein said hook portion is adapted to be placed through and hook with a respective said extension member attachment hole;
  wherein said extension member is releasably connected to said handle member.

11. The combination of claim 9, wherein said handle member and said sleeve member are formed from plastic.

12. The combination of claim 10, wherein said elongated extension member is formed from rubber.

13. The combination of claim 10, wherein said first and second attachment members are formed from a material chosen from a group of materials consisting of steel and stainless steel.

14. The combination of claim 8, wherein said universal second handle is formed having a length of 24 inches.

\* \* \* \* \*